(12) United States Patent
Li et al.

(10) Patent No.: US 9,393,509 B2
(45) Date of Patent: Jul. 19, 2016

(54) OUT-OF-VAT LIQUID FILTER FOR ENSURING RELIABLE CONNECTION OF WATER PIPE CONNECTOR

(75) Inventors: Xiuqi Li, Shenzhen (CN); Pengcheng Lei, Shenzhen (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 195 days.

(21) Appl. No.: 14/384,688

(22) PCT Filed: Mar. 12, 2012

(86) PCT No.: PCT/CN2012/072219
§ 371 (c)(1),
(2), (4) Date: Sep. 12, 2014

(87) PCT Pub. No.: WO2013/134916
PCT Pub. Date: Sep. 19, 2013

(65) Prior Publication Data
US 2015/0048017 A1 Feb. 19, 2015

(51) Int. Cl.
*A01K 63/04* (2006.01)
*B01D 35/157* (2006.01)
*B01D 35/30* (2006.01)
*B01D 35/153* (2006.01)

(52) U.S. Cl.
CPC ............ *B01D 35/306* (2013.01); *B01D 35/153* (2013.01); *B01D 35/1573* (2013.01); *B01D 35/30* (2013.01); *A01K 63/045* (2013.01); *B01D 35/157* (2013.01); *B01D 2201/302* (2013.01)

(58) Field of Classification Search
None
See application file for complete search history.

(56) References Cited

U.S. PATENT DOCUMENTS

| 5,474,674 A | * | 12/1995 | Bresolin | A01K 63/045 210/167.21 |
| 6,645,376 B2 | * | 11/2003 | Marioni | A01K 63/045 119/259 |
| 6,712,961 B2 | * | 3/2004 | Chauquet | A01K 63/045 210/167.21 |

* cited by examiner

*Primary Examiner* — Thomas M Lithgow
(74) *Attorney, Agent, or Firm* — PROI Intellectual Property US

(57) ABSTRACT

Disclosed is an out-of-vat liquid filter for ensuring reliable connection of a water pipe connector, comprising a liquid filtration tank and the water pipe connector. The water pipe connector comprises two water pipe connecting bases, a valve driving shaft, a latch tongue, a driving device with two degrees of freedom, and a handle. The latch tongue is driven by the driving device with two degrees of freedom to rotate about an axis of a first degree of freedom, thereby sliding into or our of a latch catch. The valve driving shaft is driven by the driving device with two degrees of freedom to rotate about an axis of the second degree of freedom, thereby opening or closing the water pipe connecting base in which each valve is located.

13 Claims, 9 Drawing Sheets

OUT-OF-VAT LIQUID FILTER FOR ENSURING RELIABLE CONNECTION OF WATER PIPE CONNECTOR

CROSS-REFERENCE TO RELATED APPLICATION

This Application is a Section 371 National Stage Application of International Application No. PCT/CN2012/072219, filed Mar. 12, 2012 and published as WO 2013/134916 on Sep. 19, 2013, not in English, the contents of which are hereby incorporated by reference in their entirety.

TECHNICAL FIELD

The present invention relates to a liquid filtration device placed outside the liquid container, especially to an out-of-vat liquid filter with dismountable water pipe.

BACKGROUND ART

In the prior art the out-of-vat liquid filter includes a liquid filter with filter assembly. Said filter assembly includes a filter cartridge provided with filtering material and an electrical component. Said electrical component includes a water pump and a water pump control module.

In the prior art a part of out-of-vat liquid filters are not provided with the connecting device of water inlet and outlet pipes for liquid filtration tank. When it is necessary to maintain the filter assembly in the liquid filtration tank or open the liquid filtration tank, the water inlet and outlet pipes are required to be dismounted, with inconvenient operation and easy leakage.

In order to simplify the operation, in the prior art another part of out-of-vat liquid filters are provided with a water pipe connector designed for dismounting water inlet and outlet pipes, wherein said water pipe connector is locked on the liquid filtration tank by means of operating handle and the water inlet and outlet pipes of such water pipe connector are connected to the water inlet and outlet of liquid filtration tank. However, this kind of out-of-vat liquid filter still does not avoid operational error, that is, the water pipe connector is dismounted where the valves of water inlet and outlet pipes have not been closed yet, and the problem of water leakage occurring in dismantling the water pipe connector remains unsolved.

In order to solve the problem of water leakage occurring in dismantling the water pipe connector, an out-of-vat liquid filter for synchronized linkage of the water inlet and outlet pipe valves and the water pipe connector handle is disclosed in the prior art, wherein while the handle is operated and the water pipe connector is dismantled, the water inlet and outlet pipe valves are closed, and while the handle is operated and the water pipe connector is installed, the water inlet and outlet pipe valves are opened. For said out-of-vat liquid filter, although its water pipe connector can be dismantled through closing the valve to prevent water leakage occurring in dismantling the water pipe connector, since the opening/closing of water inlet and outlet pipe valves and the locking of water pipe connector at the liquid filtration tank are simultaneously conducted during the installation of water pipe connector, if the handle is operated when the water pipe connector is installed in place, opening the water inlet and outlet pipe valves under the circumstance where the water pipe connector has not been locked on the liquid filtration tank, then the problem of water leakage still arises; in addition, in some cases a user only need to close the valves, instead of dismantling the water pipe connector, wherein, when the handle is operated for closing the valves, said water pipe connector has been in unlocked state and said water pipe connector is easy to be unintentionally moved, so when a user operates the handle for opening the valves again, it is probable that the valves are opened when the water pipe connector has not been installed in place because of unintentional movement of such connector, thereby causing water leakage.

Moreover, in the prior art the disassembly of water pipe connector for an out-of-vat liquid filter in the case where the power of electrical component has not been cut off due to negligence easily leads to personal safety accident.

CONTENT OF THE INVENTION

The invention is intended to solve the technical issues by means of avoiding the deficiencies of the above the prior art, and put forward an out-of-vat liquid filter for ensuring opening of water inlet and outlet pipe valves when the water pipe connector is locked on the liquid filtration tank as well as disassembly of water pipe connector from the liquid filtration tank when the water inlet and outlet pipe valves are closed. And said out-of-vat liquid filter also automatically starts the electrical component when the water pipe connector is locked on the liquid filtration tank as well as automatically stops the operation of electrical component when the water pipe connector is dismantled from the liquid filtration tank.

The invention can solve the said technical issues with the following technical proposals:

An out-of-vat liquid filter for ensuring reliable connection of water pipe connector is designed and manufactured, comprising a liquid filtration tank provided with liquid filter assembly and a dismountable water pipe connector connecting such liquid filtration tank, wherein said liquid filtration tank is provided with a water inlet used for importing the liquid to be processed and a water outlet used for discharging processed liquid. Especially, said water pipe connector comprises two water pipe connecting bases with respective valves, a valve driving shaft used for driving said two valves, a latch tongue used for dismountable connection of said water pipe connector to said liquid filtration tank, a driving device with two degrees of freedom which can rotate about the axes of two degrees of freedom and a handle connecting said driving device with two degrees of freedom, wherein said two water pipe connecting bases are used to connect said water inlet with a first external water pipe and said water outlet with a second external water pipe respectively and said liquid filtration tank is provided with at least one latch catch. Said latch tongue is driven by said driving device with two degrees of freedom to rotate about an axis of a first degree of freedom, thereby sliding into or out of said latch catch; said valve driving shaft is driven by said driving device with two degrees of freedom to rotate about an axis of the second degree of freedom, thereby opening or closing said water pipe connecting base where each valve is located.

Further, the middle part of said valve driving shaft is provided with a shaft hole and said driving device with two degrees of freedom has the cylindrical-surface outer wall, which is inserted to said shaft hole of said driving shaft so that said driving device with two degrees of freedom can rotate in the shaft hole. When said water pipe connector connects said liquid filtration tank, said driving device with two degrees of freedom is firstly caused by means of said handle to rotate about an axis of a first degree of freedom so as to drive said latch tongue to rotate and slide into said latch catch, and then caused by means of operating handle to rotate about an axis of the second degree of freedom so as to drive said valve driving shaft to rotate, thereby making two valves turn to opening their water pipe connecting bases and the rotation axis of said driving device with two degrees of freedom within said shaft hole leave an axis of a first degree of freedom along with rotation of said valve driving device; when said water pipe connector is required to be dismantled from said liquid filtration tank, said driving device with two degrees of freedom is firstly caused by means of said operating handle to rotate about an axis of the second degree of freedom so as to drive said valve driving shaft to rotate, thereby making two valves turn to closing their water pipe connecting bases and the rotation axis of said driving device with two degrees of freedom within said shaft hole turn along with rotation of said valve driving device to be collinear with an axis of a first degree of freedom, and then caused by said operating handle to rotate about an axis of the first degree of freedom so as to drive said latch tongue to rotate and slide out of said latch catch.

Specifically, the bottom of said driving device with two degrees of freedom is provided with a protruding connecting tongue piece. The top of said latch tongue is provided with a boss, the middle part of which is provided with a concave-down sliding chute. When the rotation axis of said driving device with two degrees of freedom within said shaft hole is collinear with an axis of a first degree of freedom, said connecting tongue piece slides into said sliding chute, causing said latch tongue to be driven by said driving device with two degrees of freedom and to rotate about an axis of a first degree of freedom accordingly; when the rotation axis of said driving device with two degrees of freedom within said shaft hole leave an axis of a first degree of freedom along with rotation of said valve driving device, said connecting tongue piece slides out of said sliding chute, causing said latch tongue not to be driven by driving device with two degrees of freedom to rotate.

In order to locate and install said driving device with two degrees of freedom, said latch tongue and said valve driving shaft, said water pipe connector also includes a fixed seat, which is provided with a shaft hole with a first degree of freedom coaxial with an axis of a first degree of freedom as well as with a shaft hole with a second degree of freedom coaxial with an axis of a second degree of freedom; said shaft hole with a first degree of freedom is connected with said shaft hole with a second degree of freedom, thus forming a shaft cavity. Said valve driving shaft is installed in said shaft hole with a second degree of freedom; said fixed seat is provided with a concave-down notch along an axis of a first degree of freedom, by means of which said driving device with two degrees of freedom installed in said shaft hole with a first degree of freedom is enabled to rotate in the shaft cavity of said fixed seat, thereby driving said valve driving shaft to rotate. Below the shaft hole with a first degree of freedom of said fixed seat said latch tongue is connected rotatably.

In order to achieve locking or unlocking of said latch catch and said latch tongue, at the top of said liquid filtration tank, two latch catches are installed between said water inlet and said water outlet; said latch catch includes a vertically-installed latch catch wall and a latch catch hook, one end of which is installed at the top of said latch catch wall and the other end of which protrudes in a horizontal direction, thereby forming a hook mouth between said latch catch wall and said latch catch hook; the hook mouths of two latch catches are installed directly facing each other. Said latch tongue is annularly columnar and the cylindrical-surface outer wall of said latch tongue is symmetrically provided with two radially concave notches; when said water pipe connector is installed on said liquid filtration tank, said latch catches pass said latch tongue through their corresponding notches respectively, causing said latch tongue to be caught between two latch catch walls, and the bottom surface of said latch catch hook is higher than the top surface of said latch tongue; said latch tongue is rotated to make its annular column located below said latch catch hook, that is, it is achieved that said latch tongue slides into said latch catch, thereby connecting said water pipe connector to said liquid filtration tank.

In order to achieve rotatable connection of said latch tongue with said fixed seat, said latch tongue is annularly columnar, the top surface of said latch tongue is provided with an annular top groove denting downward along the axis of said latch tongue, the bottom surface of said latch tongue is provided with an annular bottom groove denting upward along the axis of said latch tongue, and the diameter of said annular top groove is less than that of said annular bottom groove; said latch tongue is also provided with an annular sliding chute which is connected with the bottom of said annular top groove as well as the top of said annular bottom groove. Said shaft hole with a first degree of freedom is provided with an annular enclosure wall stretching downward at the orifice edge at the bottom of said fixed seat, and said annular enclosure wall is provided with at least two flanges. Said annular enclosure wall is inserted into said annular top groove of said latch tongue, and rotatable connection of said latch tongue is achieved below said shaft hole with a first degree of freedom by means of catching said flange in said annular sliding chute.

In order to prevent free rotation of said latch tongue from affecting the installation and location of said water pipe connector after such water pipe connector is dismantled, the outer wall at the bottom of said fixed seat is provided with a support protruding outside said fixed seat, and at the end of said support a retaining piece protruding downward is installed. The outer wall of said latch tongue is provided with an elastic bearing rod whose root is flexibly connected with the outer wall of said latch tongue, and there is space left between said elastic bearing rod and said outer wall of latch tongue; when the head of said elastic bearing rod is pressed, said elastic bearing rod can move in the outer wall direction of said latch tongue; when said latch tongue slides out of said latch catch, the head of said elastic bearing rod is not pressed but placed against said retaining piece so that when said water pipe connector is not installed on said liquid filtration tank said latch tongue is prevented from rotating. Said liquid filtration tank is provided with a push piece so that when said water pipe connector is installed on said liquid filtration tank said push piece forces the head of said elastic bearing rod to be pressed and to move in the outer wall direction of said latch tongue, thereby causing the head of said elastic bearing rod to avoid said retaining piece from blocking and then enabling said latch tongue to rotate.

The filter assembly in said liquid filtration tank includes an electrical component, and in order to achieve automatic start and stop of said electrical component, said liquid filtration tank is provided with a micro-switch which controls the start and stop of said electrical component. There is a pressing plate connected with said latch tongue. When said water pipe connector is installed on said liquid filtration tank and said latch tongue slides into said latch catch, said pressing plate presses said micro-switch, causing the electrical component in said liquid filtration tank to start operating; under the circumstance where said water pipe connector is dismantled from said liquid filtration tank, when said latch tongue slides out of said latch catch, said pressing plate releases said microswitch along with rotation of said latch tongue, causing said electrical component in said liquid filtration tank to stop operating.

In order to achieve automatic start and stop of said electrical component, said liquid filtration tank is provided with a magnetic sensor which controls the start and stop of said electrical component. There is a permanent magnet connected with said latch tongue. When said water pipe connector is installed on said liquid filtration tank and said latch tongue slides into said latch catch, said permanent magnet approaches said magnetic sensor, causing the electrical component in said liquid filtration tank to start operating; under the circumstance where said water pipe connector is dismantled from said liquid filtration tank, when said latch tongue slides out of said latch catch, said permanent magnet keeps away from said magnetic sensor along with rotation of said latch tongue, causing said electrical component in said liquid filtration tank to stop operating.

The concrete structure of said water pipe connecting base is that it includes a valve seat with a cavity internally, a tubular filtration tank pipe connected at the bottom of said valve seat and a tubular joint pipe connected at the top of said valve seat. The cavity in said valve seat is connected with said filtration tank pipe and said joint pipe respectively; said valve is installed in the cavity of said valve seat; said two filtration tank pipes are used to connect said water inlet and said water outlet respectively and said two joint pipes are used to connect a first externally-connecting water pipe and a second externally-connecting water pipe.

In order to achieve location and installation of said water pipe connecting base, said water inlet and said water outlet are installed at the top of said liquid filtration tank, and two latch catches are installed between said water inlet and said water outlet; said latch catch includes a vertically-installed latch catch wall, a latch catch hook, one end of which is connected at the top of said latch catch wall and the other end of which protrudes in a horizontal direction, and a positioning boss which is installed vertically upward at the top surface of one end of said latch catch hook not connecting said latch catch wall; a hook mouth is formed between said latch catch wall and said latch catch hook; the hook mouths of two latch catches are installed directly facing each other. Said two valve seats are provided with locating notches respectively which are formed with their bottom surfaces concave upward and their side walls concave inward, and said two locating notches are installed directly facing each other. When said water pipe connector is installed on said liquid filtration tank, said two positioning bosses are inserted into two locating notches correspondingly, thereby achieving located installation of said water pipe connecting base on said liquid filtration tank. Concrete solution where said valve is driven by the valve driving shaft is that said valve is the ball valve formed after two spherical caps of a sphere with cylindrical surface through-hole are cut off by two parallel planes parallel to said cylindrical surface through-hole, wherein said cylindrical surface through-hole is valve hole and the plane formed after spherical caps are cut off is valve face; on the side of said valve a flat cubic cylindrical surface shaft connecting hole, the axial central axis of which is perpendicular to the axis of said valve hole; said shaft connecting holes of two valves are installed directly facing each other. One side of said valve seat is provided with a transverse shaft through-hole, and said transverse shaft through-holes of two valve seats are installed directly facing each other. Both ends of said valve driving shaft are provided with flat cubic valve plugs respectively; both ends of said valve driving shaft pass through said transverse shaft through-holes of said valve seats corresponding to these two ends and are inserted into said shaft connecting holes corresponding to them respectively, thereby two valves being connected at both ends of said valve driving shaft respectively.

The top of said liquid filtration tank is provided with a concave-down recess, in which said water inlet, said water outlet and said latch catch are installed; said water pipe connector also includes a connecting cover, which includes a top plate and an enclosure wall stretching downward from the edge of said top plate; said top plate is provided with two through-holes, which are used for connecting two water pipe connecting bases respectively; on said top plate a handle operated recess is installed between two through-holes; said fixed seat is permanently connected with the bottom surface of said top plate to make said handle operate in said handle-operated recess. Compared with the existing technology, technical effects of the invention "an out-of-vat liquid filter for ensuring reliable connection of water pipe connector" are that:

1. Said latch tongue and said valve driving shaft are caused by said driving device with two degrees of freedom to rotate about the axes of different degrees of freedom so that: said valves can be opened only after said water pipe connector is permanently connected to said liquid filtration tank, said water pipe connector can be dismantled from said liquid filtration tank only after said valves are closed, and any water leakage is effectively prevented because of any faulty operation during the installation and removal of said water pipe connector, thereby improving reliability of water pipe connector;

2. When said valves are closed, said water pipe connector in this invention is still kept locked on said liquid filtration tank, and when a user needs to close valves rather than dismantle the water pipe connector, said water pipe connector will not be unlocked because of closing of said valves so that said water pipe connector will not be moved without intention, thereby ensuring that said valves can be normally opened, not as long as closing valves will cause the water pipe connector to be unlocked in the prior art so as to result in water leakage;

3. The automatic start of said electrical component after installation of said water pipe connection on said liquid filtration tank and the automatic stop of said electrical component before removal of said water pipe connector on said liquid filtration tank are achieved by means of said microswitch or magnetic sensor, ensuring safety in use of said out-of-vat liquid filter.

MODE OF CARRYING OUT THE INVENTION MODEL

Figure 1:
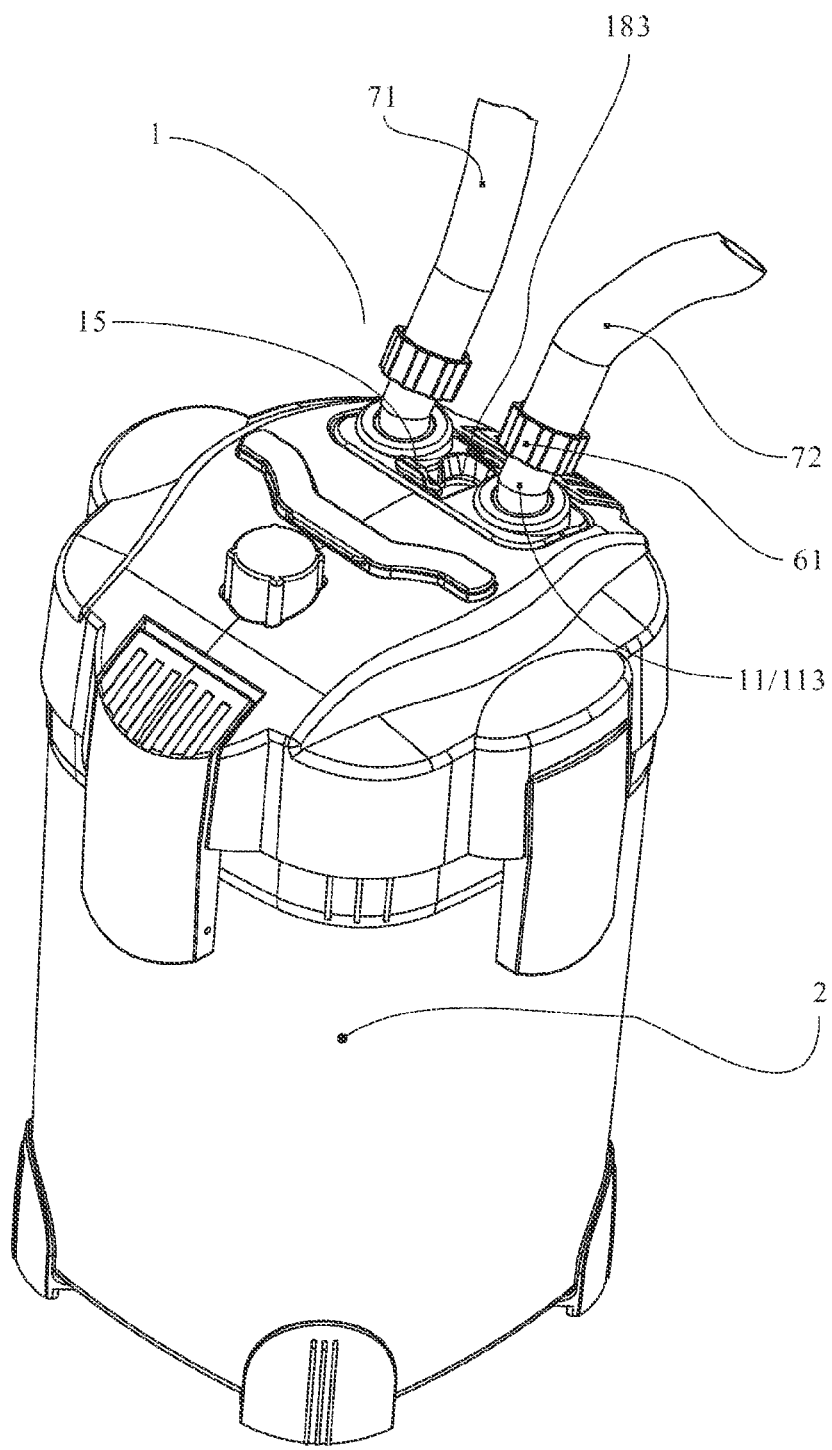
FIG. 1 is a schematic diagram for axonometric projection of preferred embodiment of this invention "an out-of-vat liquid filter for ensuring reliable connection of water pipe connector"

To further illustrate the principle and structure of the invention, the invention is further described in detail in accordance with the preferable embodiments shown in the figures.

The present invention provides an out-of-vat liquid filter for ensuring reliable connection of water pipe connector, as shown in FIGS. 1 to 9, comprising a liquid filtration tank 2 provided with liquid filter assembly and a dismountable water pipe connector 1 connecting such liquid filtration tank 2, wherein said liquid filtration tank 2 is provided with a water inlet 21 used for importing the liquid to be processed and a water outlet 22 used for discharging processed liquid. Said filter assembly includes a filter cartridge provided with filtering material and an electrical component. Said electrical component includes a water pump and a control module which controls such water pump. Said water pipe connector 1 comprises two water pipe connecting bases 11 with respective valves 3, a valve driving shaft 12 used for driving said two valves 3, a latch tongue 13 used for dismountable connection of said water pipe connector 1 to said liquid filtration tank 2, a driving device 14 with two degrees of freedom which can rotate about the axes of two degrees of freedom and a handle 15 connecting said driving device 14 with two degrees of freedom, wherein said two water pipe connecting bases 11 are used to connect said water inlet 21 with a first external water pipe and said water outlet 22 with a second external water pipe respectively and said liquid filtration tank 2 is provided with at least one latch catch 23. Said latch tongue 13 is driven by said driving device 14 with two degrees of freedom to rotate about an axis of a first degree of freedom, thereby sliding into or out of said latch catch 23; said valve driving shaft 12 is driven by said driving device 14 with two degrees of freedom to rotate about an axis of the second degree of freedom, thereby opening or closing said water pipe connecting base 11 where each valve 3 is located.

In the present invention, the locking and unlocking of said water pipe connector 1 and said liquid filtration tank 2 as well as the closing and opening of said valves 3 are conducted within two degrees of freedom respectively to make two actions be completed successively rather than synchronically, ensuring that said valves 3 can be opened only when said water pipe connector 1 and said liquid filtration tank 2 are locked and said water pipe connector 1 can be dismantled from said liquid filtration tank 2 only when said valves are closed, so any water leakage is effectively prevented during the installation and removal of said water pipe connector 1, with simple operation as well as improvement on reliability of said water pipe connector 1.

Figure 6:
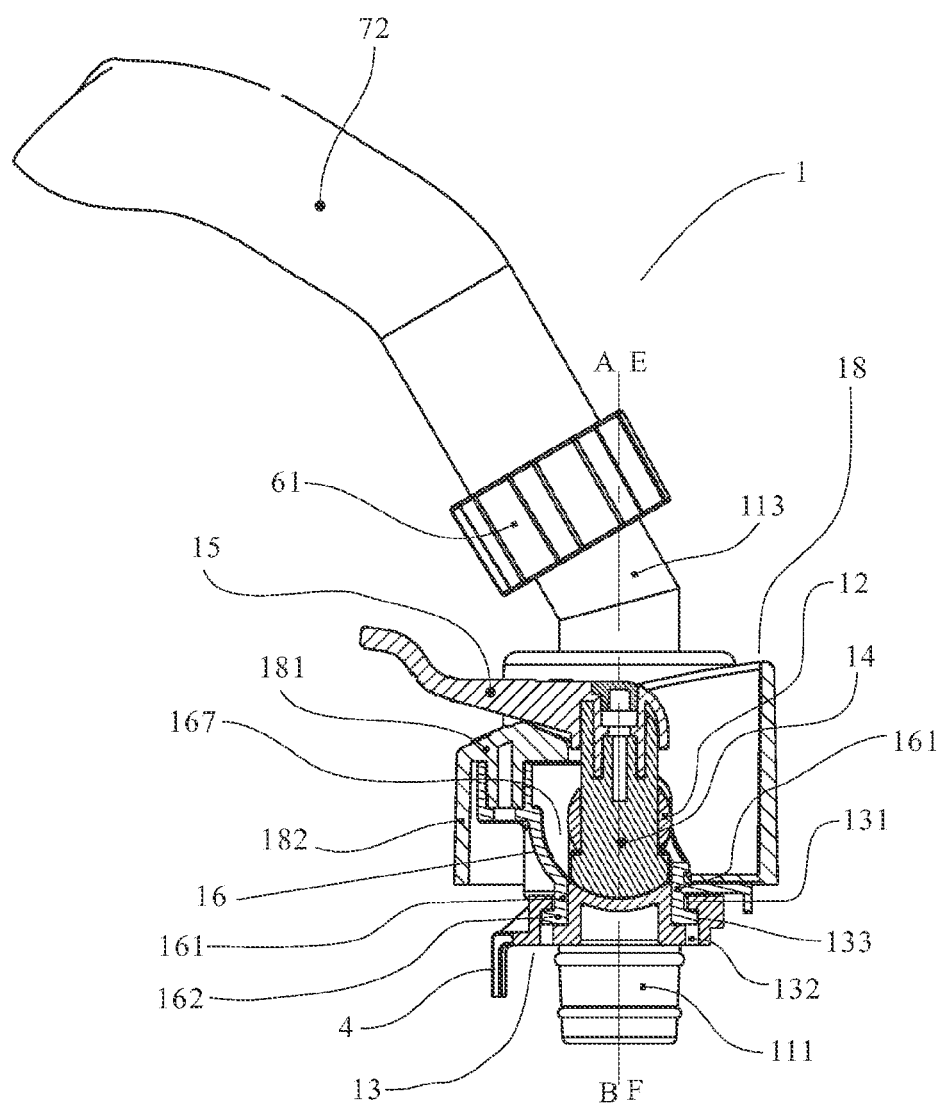
FIG. 6 is a left sectional view for orthographic projection of said water pipe connector 1 in said preferred embodiment, wherein said valves are in a closed state.
Figure 7:
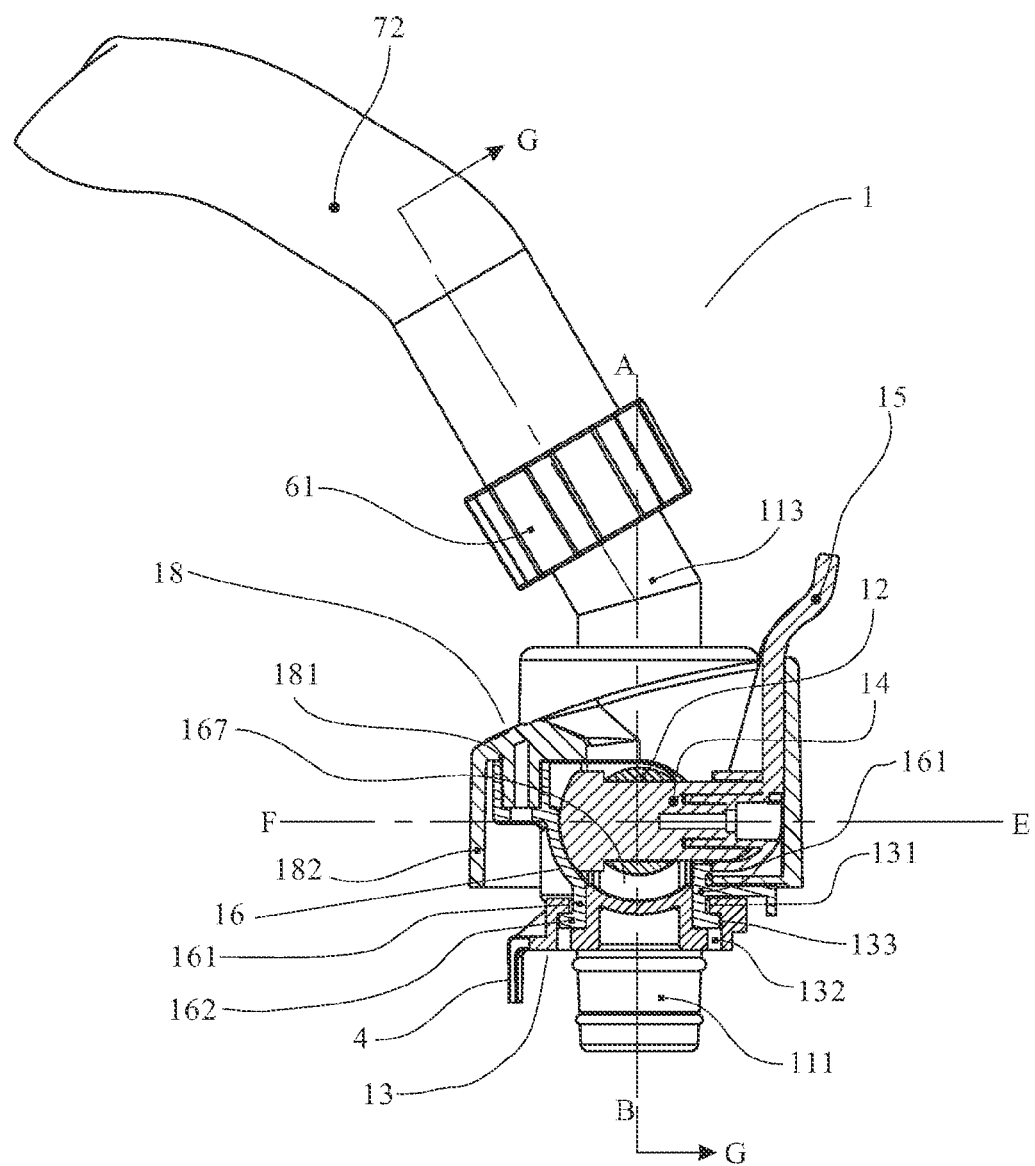
FIG. 7 is a left sectional view for orthographic projection of said water pipe connector 1 in said preferred embodiment, wherein said valves are in an opened state.

In a preferred embodiment of this invention, as shown in FIGS. 6 to 9, the middle part of said valve driving shaft 12 is provided with a shaft hole 121 and said driving device 14 with two degrees of freedom has the outer wall with cylindrical surface, which is inserted to said shaft hole 121 of said driving shaft 12 so that said driving device 14 with two degrees of freedom can rotate in the shaft hole 121. When said water pipe connector 1 connects said liquid filtration tank 2, as shown in FIGS. 6 and 7, said driving device 14 with two degrees of freedom is caused by means of said handle 15 to rotate about an axis AB of a first degree of freedom so as to drive said latch tongue 13 to rotate and slide into said latch catch 23, and then caused by means of operating handle 15 to rotate about an axis CD of the second degree of freedom so as to drive said valve driving shaft 12 to rotate, thereby making two valves 3 turn to opening their water pipe connecting bases 11 and the rotation axis EF of said driving device 14 with two degrees of freedom within said shaft hole 121 leave an axis AB of a first degree of freedom along with rotation of said valve driving device 12; when said water pipe connector 1 is required to be dismantled from said liquid filtration tank 2, as shown from FIG. 7 to FIG. 6, said driving device 14 with two degrees of freedom is caused by means of said operating handle 15 to rotate about an axis CD of the second degree of freedom so as to drive said valve driving shaft 12 to rotate, thereby making two valves 3 turn to closing their water pipe connecting bases 11 and the rotation axis EF of said driving device 14 with two degrees of freedom within said shaft hole 121 turn along with rotation of said valve driving device 12 to be collinear with an axis AB of a first degree of freedom, and then caused by said operating handle 15 to rotate about an axis of the first degree of freedom so as to drive said latch tongue 13 to rotate and slide out of said latch catch 23.

Figure 8:
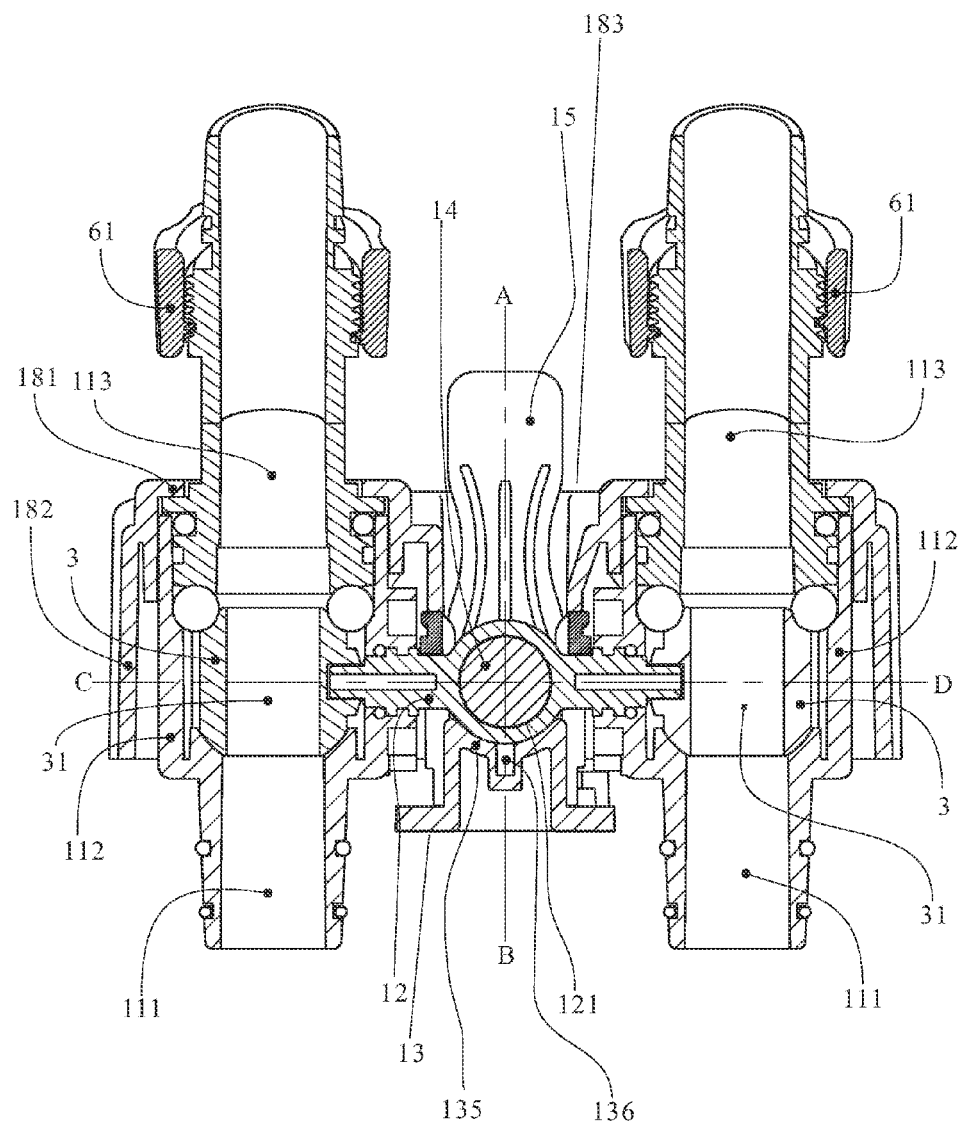
FIG. 8 is G-G sectional view of FIG. 7.
Figure 9:
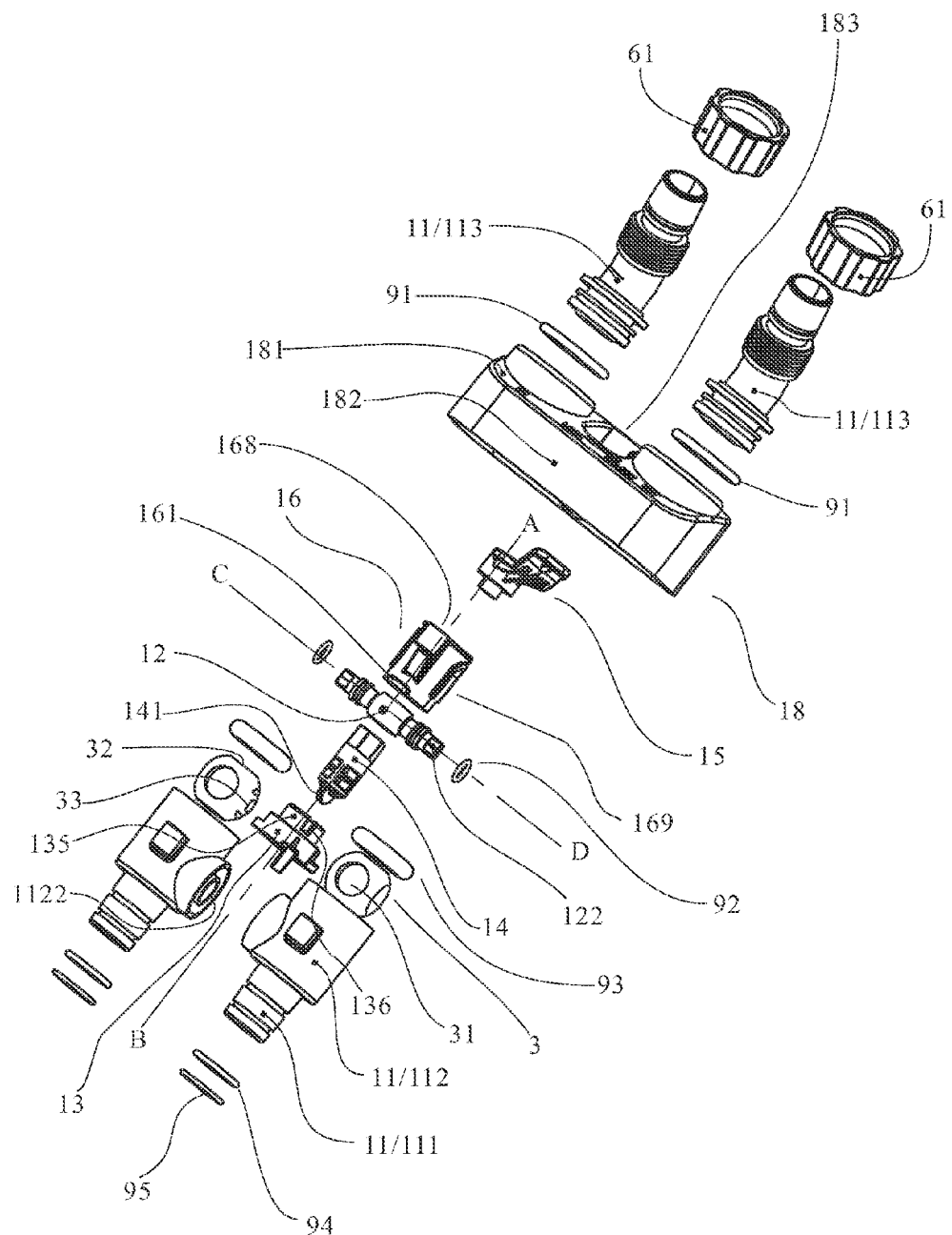
FIG. 9 is a schematic diagram for axonometric projection of said water pipe connector 1 in said preferred embodiment in a decomposition state.

In a preferred embodiment of this invention, as shown in FIGS. 8 and 9, the bottom of said driving device 14 with two degrees of freedom is provided with a protruding connecting tongue piece 141. The top of latch tongue 13 is provided with a boss 135, the middle part of which is provided with a concave-down sliding chute 136. When the rotation axis EF of said driving device 14 with two degrees of freedom within said shaft hole 121 is collinear with an axis AB of a first degree of freedom, said connecting tongue piece 141 slides into said sliding chute 136, causing said latch tongue 13 to be driven by said driving device 14 with two degrees of freedom and to rotate about an axis of a first degree of freedom accordingly; when the rotation axis EF of said driving device 14 with two degrees of freedom within said shaft hole 121 leave an axis AB of a first degree of freedom along with rotation of said valve driving device 12, said connecting tongue piece 141 slides out of said sliding chute 136, causing said latch tongue 13 not to be driven by driving device 14 with two degrees of freedom to rotate. In order to locate and install said driving device 14 with two degrees of freedom, said latch tongue 13 and said valve driving shaft 12, in a preferred embodiment of this invention, as shown in FIGS. 6 to 9, said water pipe connector 1 also includes a fixed seat 16, which is provided with a shaft hole 168 with a first degree of freedom coaxial with an axis AB of a first degree of freedom as well as with a shaft hole 169 with a second degree of freedom coaxial with an axis CD of a second degree of freedom; said shaft hole 168 with a first degree of freedom is connected with said shaft hole 169 with a second degree of freedom, thus forming a shaft cavity 167. Said valve driving shaft 12 is installed in said shaft hole 169 with a second degree of freedom; said fixed seat 16 is provided with a concave-down notch along an axis of a first degree of freedom, by means of which said driving device 14 with two degrees of freedom installed in said shaft hole 168 with a first degree of freedom is enabled to rotate in the shaft cavity 167 of said fixed seat 16, thereby driving said valve driving shaft 12 to rotate. Below the shaft hole 168 with a first degree of freedom of said fixed seat 16 said latch tongue 13 is connected rotatably.

In the present invention, when said valves are closed, said water pipe connector 1 is still kept locked on said liquid filtration tank 2, not as long as in the prior art, when said valves are closed, said water pipe connector is caused to be unlocked. When a user needs to close said valves 3 rather than dismantle the water pipe connector 1, said water pipe connector 1 will not be unlocked because of closing of said valves 3 so that said water pipe connector 1 will not be moved without intention, thereby ensuring that said valves 3 can be normally opened, not as long as closing valves will cause the water pipe connector to be unlocked in the prior art so as to result in water leakage, further ensuring reliability of water pipe connector.

Figure 4:
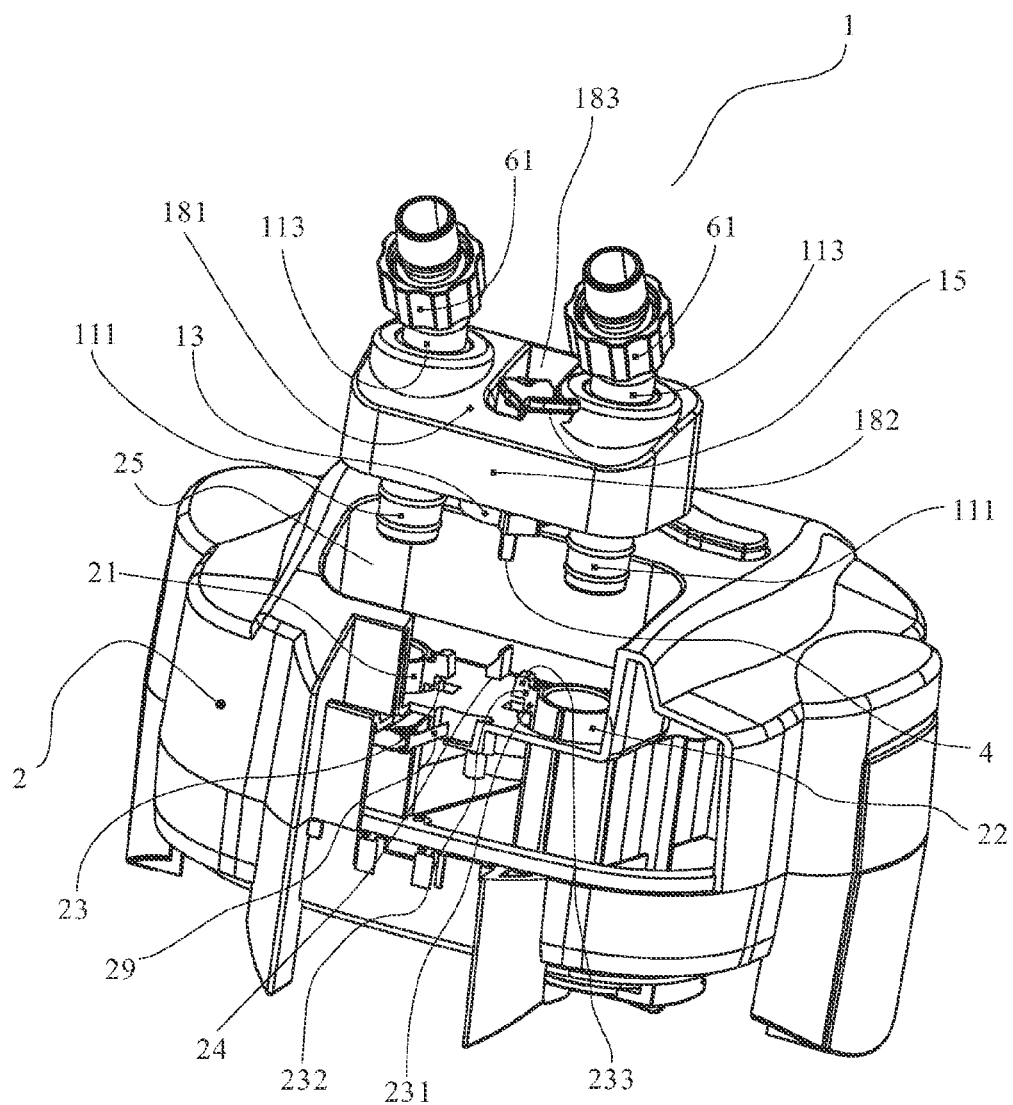
FIG. 4 is a schematic diagram for axonometric projection of said water pipe connector 1 and said liquid filtration tank 2 in said preferred embodiment in a decomposition state.

In order to achieve locking or unlocking of said latch catch and said latch tongue, in a preferred embodiment of the present invention, as shown in FIG. 4, at the top of said liquid filtration tank 2, two latch catches 23 are installed between said water inlet 21 and said water outlet 22; said latch catch 23 includes a vertically-installed latch catch wall 231 and a latch catch hook 232, one end of which is installed at the top of said latch catch wall 231 and the other end of which protrudes in a horizontal direction, thereby forming a hook mouth between said latch catch wall 231 and said latch catch hook 232; the hook mouths of two latch catches 23 are installed directly facing each other. Said latch tongue 13 is annularly columnar and the cylindrical-surface outer wall of said latch tongue 13 is symmetrically provided with two radially concave notches 134; when said water pipe connector 1 is installed on said liquid filtration tank 2, said latch catches 23 pass said latch tongue 13 through their corresponding notches 134, causing said latch tongue 13 to be caught between two latch catch walls 231, and the bottom surface of said latch catch hook 232 is higher than the top surface of said latch tongue 13; said latch tongue 13 is rotated to make its annular column located below said latch catch hook 232, that is, it is achieved that said latch tongue 13 slides into said latch catch 23, thereby connecting said water pipe connector 1 to said liquid filtration tank 2.

In order to achieve rotatable connection of said latch tongue 13 with said fixed seat 16, in a preferred embodiment of this invention, as shown in FIGS. 5 to 9, said latch tongue 13 is annularly columnar, the top surface of said latch tongue 13 is provided with an annular top groove 131 denting downward along the axis of said latch tongue 13, the bottom surface of said latch tongue 13 is provided with an annular bottom groove 132 denting upward along the axis of said latch tongue 13, and the diameter of said annular top groove 131 is less than that of said annular bottom groove 132; said latch tongue 13 is also provided with an annular sliding chute 133 which is connected with the bottom of said annular top groove 131 as well as the top of said annular bottom groove 132. Said shaft hole 168 with a first degree of freedom is provided with an annular enclosure wall 161 stretching downward at the orifice edge at the bottom of said fixed seat (16), and said annular enclosure wall 161 is provided with at least two flanges 162. Said annular enclosure wall 161 is inserted into said annular top groove 131 of said latch tongue 13, and rotatable connection of said latch tongue 13 is achieved below said shaft hole 168 with a first degree of freedom by means of catching said flange 162 in said annular sliding chute 131.

Figure 2:
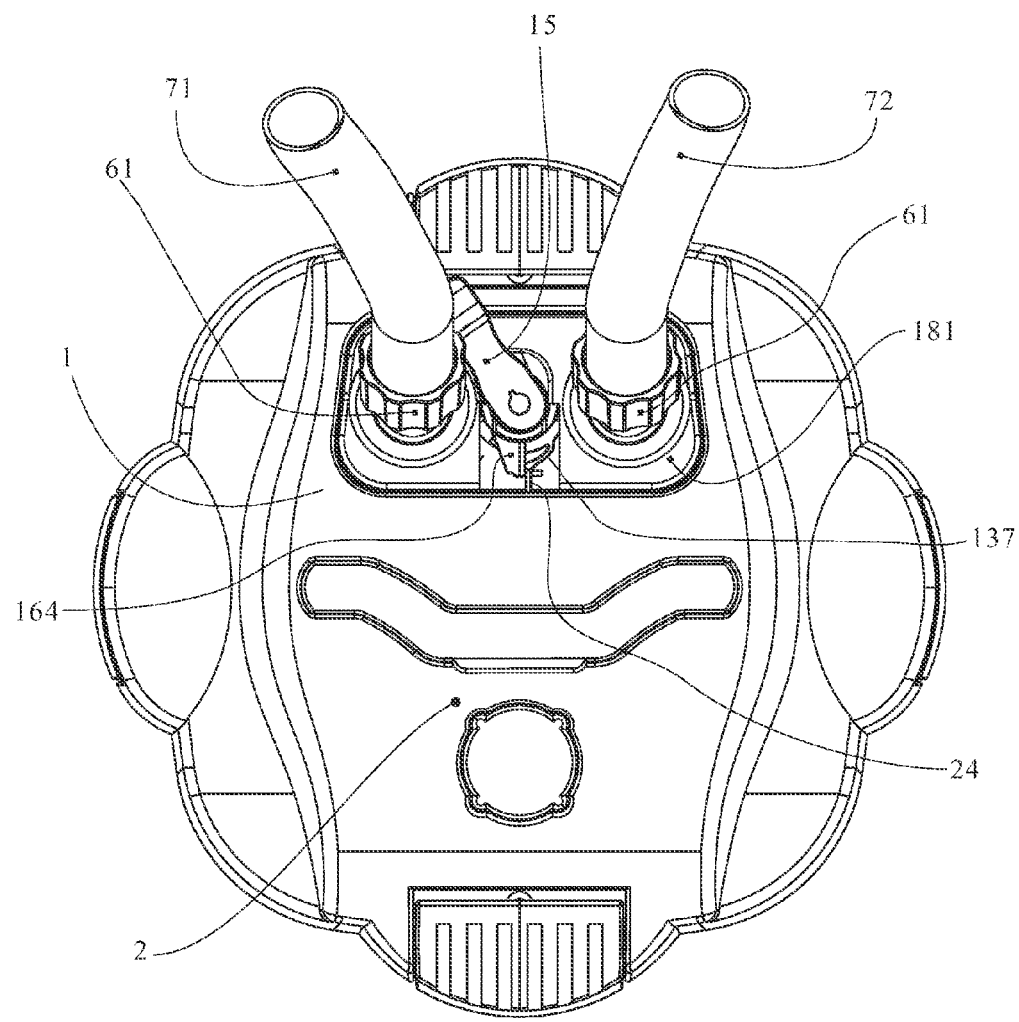
FIG. 2 is a vertical view for orthographic projection of said preferred embodiment before said water pipe connector 1 locks said liquid filtration tank 2.

In order to prevent free rotation of said latch tongue 13 from affecting the installation and location of said water pipe connector 1 after such water pipe connector 1 is dismantled, in a preferred embodiment of this invention, as shown in FIGS. 2 and 4, the outer wall at the bottom of said fixed seat 16 is provided with a support 164 protruding outside said fixed seat 16, and at the end of said support 164 a retaining piece 163 protruding downward is installed. The outer wall of said latch tongue 13 is provided with an elastic bearing rod 137 whose root is flexibly connected with the outer wall of said latch tongue 13, and there is space left between said elastic bearing rod 137 and said outer wall of latch tongue 13; when the head of said elastic bearing rod 137 is pressed, said elastic bearing rod 137 can move in the outer wall direction of said latch tongue 13; when said latch tongue 13 slides out of said latch catch 23, the head of said elastic bearing rod 137 is not pressed but placed against said retaining piece 163 so that when said water pipe connector 1 is not installed on said liquid filtration tank 2, said latch tongue 13 is prevented from rotating. Said liquid filtration tank 2 is provided with a push piece 24 so that when said water pipe connector 1 is installed on said liquid filtration tank 2 said push piece 24 forces the head of said elastic bearing rod 137 to be pressed to move in the outer wall direction of said latch tongue 13, thereby causing the head of said elastic bearing rod 137 to avoid said retaining piece 163 from blocking and then enabling said latch tongue 13 to rotate. The filter assembly in said liquid filtration tank 2 includes an electrical component, and in a preferred embodiment of this invention, in order to achieve automatic start and stop of said electrical component, as shown in FIG. 4, said liquid filtration tank 2 is provided with a micro-switch 29 which controls the start and stop of said electrical component. There is a pressing plate 4 connected with said latch tongue 13. When said water pipe connector 1 is installed on said liquid filtration tank 2 and said latch tongue 13 slides into said latch catch 23, said pressing plate 4 presses said micro-switch 29, causing the electrical component in said liquid filtration tank 2 to start operating; under the circumstance where said water pipe connector 1 is dismantled from said liquid filtration tank 2, when said latch tongue 13 slides out of said latch catch 23, said pressing plate 4 releases said micro-switch 29 along with rotation of said latch tongue 13, causing said electrical component in said liquid filtration tank 2 to stop operating.

In order to achieve automatic start and stop of said electrical component, this invention also provide a non-contacting sensor as the switch element and said liquid filtration tank 2 is provided with a magnetic sensor which controls the start and stop of said electrical component. There is a permanent magnet connected with said latch tongue 13. When said water pipe connector 1 is installed on said liquid filtration tank 2 and said latch tongue 13 slides into said latch catch 23, said permanent magnet approaches said magnetic sensor, causing the electrical component in said liquid filtration tank 2 to start operating; under the circumstance where said water pipe connector 1 is dismantled from said liquid filtration tank 2, when said latch tongue 13 slides out of said latch catch 23, said permanent magnet keeps away from said magnetic sensor along with rotation of said latch tongue 13, causing said electrical component in said liquid filtration tank 2 to stop operating.

In a preferred embodiment of this invention, as shown in FIG. 9, said water pipe connecting base 11 includes a valve seat 112 with a cavity internally, a tubular filtration tank pipe 112 connected at the bottom of said valve seat 111 and a tubular joint pipe 112 connected at the top of said valve seat 113. The cavity in said valve seat 112 is connected with said filtration tank pipe 111 and said joint pipe 113 respectively; said valve 3 is installed in the cavity of said valve seat 112; said two filtration tank pipes 111 are used to connect said water inlet 21 and said water outlet 22 respectively and said two joint pipes 113 are used to connect a first externally-connecting water pipe 71 and a second externally-connecting water pipe 72. Said two joint pipes 113 are connected with a first externally-connecting water pipe 71 and a second externally-connecting water pipe 72 respectively by means of a lock nut 61.

In order to achieve location and installation of said water pipe connecting base, in a preferred embodiment of this invention, as shown in FIG. 4, said water inlet 21 and said water outlet 22 are installed at the top of said liquid filtration tank 2, and two latch catches 23 are installed between said water inlet 21 and said water outlet 22; said latch catch includes 23 a vertically-installed latch catch wall 231, a latch catch hook 232, one end of which is connected at the top of said latch catch wall 231 and the other end of which protrudes in a horizontal direction, and a positioning boss 233 which is installed vertically upward at the top surface of one end of said latch catch hook 232 not connecting said latch catch wall 231; a hook mouth is formed between said latch catch wall 231 and said latch catch hook 232; the hook mouths of two latch catches 23 are installed directly facing each other. Said two valve seats 112 are provided with locating notches 1121 respectively which are formed with their bottom surfaces concave upward and their side walls concave inward, and said two locating notches 1121 are installed directly facing each other. When said water pipe connector 1 is installed on said liquid filtration tank 2, said two positioning bosses 233 are inserted into two locating notches 1121 correspondingly, thereby achieving located installation of said water pipe connecting base 11 on said liquid filtration tank 2.

In a preferred embodiment of this invention, as shown in FIG. 9, said valve 3 is the ball valve formed after two spherical caps of a sphere with cylindrical surface through-hole are cut off by two parallel planes parallel to said cylindrical surface through-hole, wherein said cylindrical surface through-hole is valve hole 31 and the plane formed after spherical caps are cut off is valve face 32; the side of said valve 3 is provided with a flat cubic cylindrical surface shaft connecting hole 33, the axial central axis of which is perpendicular to the axis of said valve hole 31; said shaft connecting holes 33 of two valves 3 are installed directly facing each other. One side of said valve seat 112 is provided with a transverse shaft through-hole 1122, and said transverse shaft through-holes 1122 of two valve seats 112 are installed directly facing each other. Both ends of said valve driving shaft 12 are provided with flat cubic valve plugs 122 respectively; both ends of said valve driving shaft 12 pass through said transverse shaft through-holes 1122 of said valve seats 112 corresponding to these two ends and are inserted into said shaft connecting holes 33 corresponding to them respectively, thereby two valves 3 being connected at both ends of said valve driving shaft 12 respectively.

In a preferred embodiment of this invention, as shown in FIG. 4, the top of said liquid filtration tank 2 is provided with a concave-down recess 25, in which said water inlet 21, water outlet 22 and said latch catch 23 are installed. Said water pipe connector 1 also includes a connecting cover 18, which includes a top plate 181 and an enclosure wall 182 stretching downward from the edge of said top plate 181; said top plate 182 is provided with two through-holes, which are used for connecting two water pipe connecting bases 11 respectively; on said top plate 181 a handle operated recess 183 is installed between two through-holes; said fixed seat 16 is permanently connected with the bottom surface of said top plate 181 to make said handle 15 operate in said handle-operated recess 183.

In a preferred embodiment of this invention, as shown in FIG. 9, the tight connection of all parts of said water pipe connector 1 is achieved by means of sealing rings 91, 92, 93, 94 and 95 to prevent water leakage.

Figure 5:
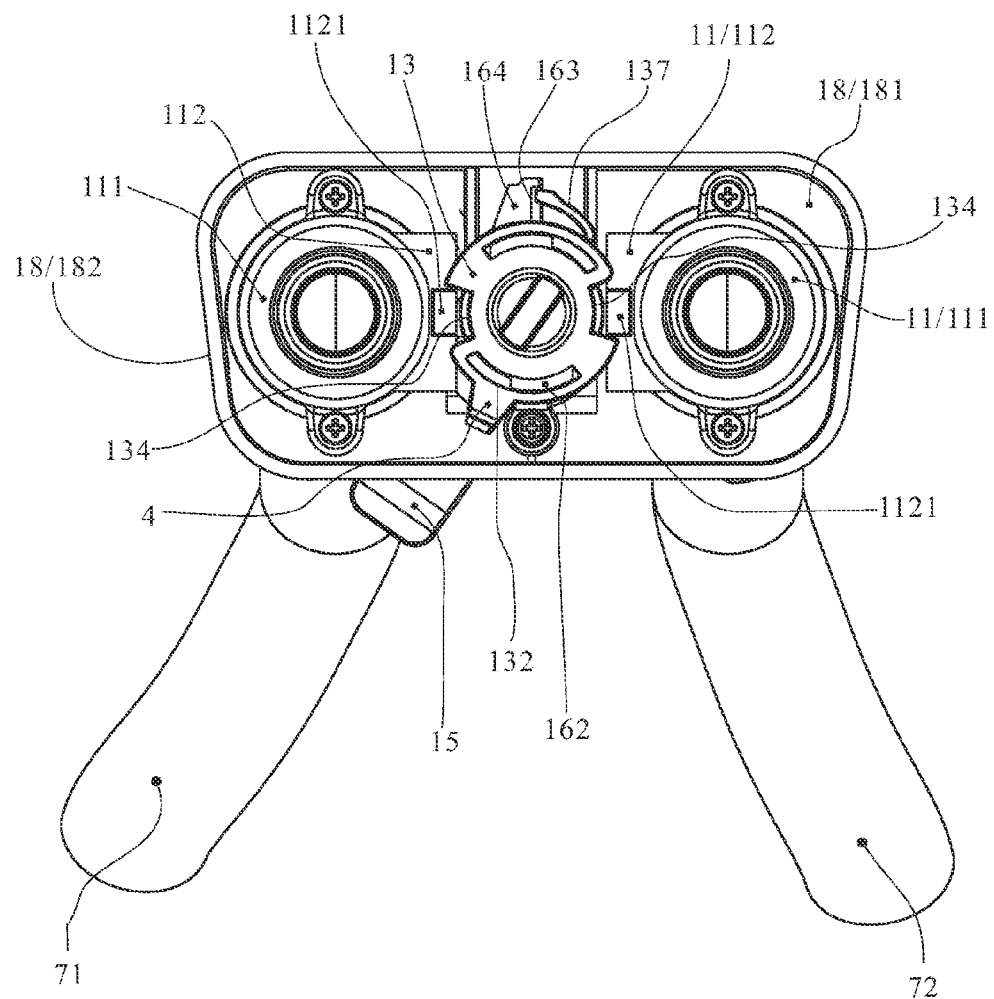
FIG. 5 is an upward view for orthographic projection of said water pipe connector 1 in said preferred embodiment.

In the preferential embodiment of the present invention, said water pipe connector 1 is installed to said liquid filtration tank 2 according to the following procedures:

Before said water pipe connector 1 is installed, said elastic bearing rod 137 is in a naturally reset state, the head of said elastic bearing rod 137 is placed against said retaining piece 163, enabling said latch tongue 13 not to rotate. As shown in FIG. 5, said handle 15 is deflected to one side to make said notches 134 of said latch tongue 13 and said location notches 1121 at the bottom of said connecting base 112 correspond to said latch catches 23 respectively so that located installation of said water pipe connector 1 is achieved by means of said elastic bearing rod 137 and said retaining piece 163.

Firstly, said connecting cover 18 is placed in said recess 25. As stated above, respective positioning bosses 233 of said two latch catches 23 pass two notches 134 of said latch tongue 13 to enter two location notches 1121 of said connecting bases 112, and said latch tongue 13 is clamped between respective latch catch walls 231 of two latch catches 23; at this moment, said push piece 24 on said liquid filtration tank 2 drives the head of said elastic bearing rod 137 to move toward the latch tongue wall so that said elastic bearing rod 137 is caused to avoid said retaining piece 163 from blocking and prepare for locking of said water pipe connector 1 on said liquid filtration tank 2.

Figure 3:
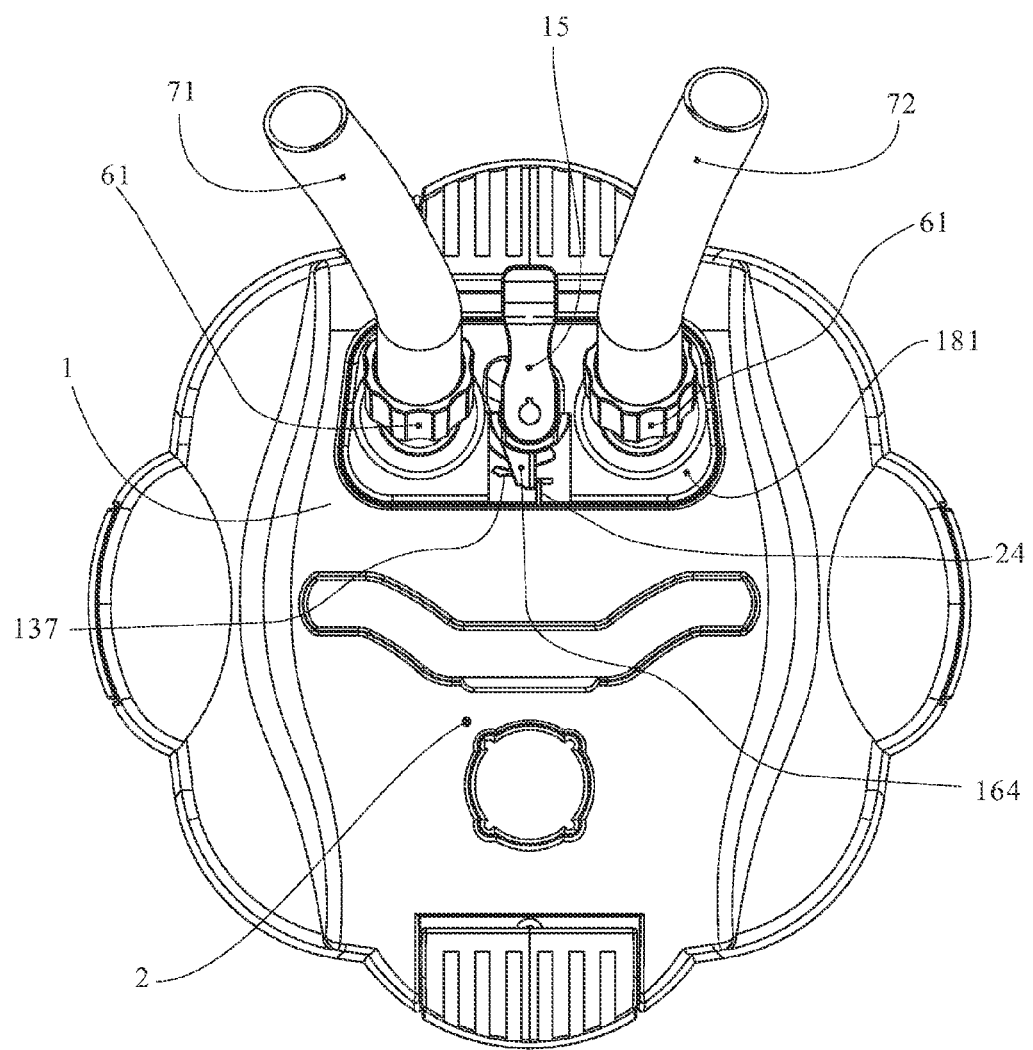
FIG. 3 is a vertical view for orthographic projection of said preferred embodiment after said water pipe connector 1 locks said liquid filtration tank 2.

Then, said handle 15 is rotated about the axis AB of a first degree of freedom to make said handle 15 turn from the state as shown in FIG. 2 to the state as shown in FIG. 3. Said elastic bearing rod 137 is not restricted by said push piece 24 any longer with rotation of said latch tongue 13 to be naturally reset, and the annular cylindrical surface of said latch tongue 13 rotates to be below two latch catch hooks 232, by means of which said latch tongue 13 is locked and then said water pipe connector 1 is caused to be connected with said liquid filtration tank. After said latch tongue 13 rotates to be in place, said pressing plate 4 on said latch tongue 13 precisely presses on said micro-switch 29 on said liquid filtration tank so that when said water pipe connector 1 is connected to said liquid filtration tank 2 the electrical component is started.

Finally, said handle 15 is rotated about the axis CD of a second degree of freedom to make said handle 15 turn from the state as shown in FIG. 6 to the state as shown in FIG. 7. Said valve driving shaft 12 is driven by said driving device 14 with two degrees of freedom to rotate so that said valves 3 are opened to make the water route of said liquid filtration tank 2 connect with the external water pipe. In that process, since the rotation axis EF of said driving device 14 with two degrees of freedom within said shaft hole 121 has left the axis AB of a first degree of freedom, said tongue piece 141 slides out of said sliding chute 136 so as to enable said driving device 14 with two degrees of freedom not to drive said latch tongue 13 during this process, thereby ensuring reliable connection of said water pipe connector 1.

In the preferential embodiment of the present invention, said water pipe connector 1 is removed from said liquid filtration tank 2 according to the following procedures: Firstly, said handle 15 is rotated about the axis CD of a second degree of freedom to make said handle 15 turn from the state as shown in FIG. 7 to the state as shown in FIG. 6. Said valve driving shaft 12 is driven by said driving device 14 with two degrees of freedom to rotate so that said valves 3 are closed to make the water route of said liquid filtration tank 2 disconnect with the external water pipe. In that process, since the rotation axis EF of said driving device 14 with two degrees of freedom within said shaft hole 121 has turned to be collinear with the axis AB of a first degree of freedom, said tongue piece 141 slides into said sliding chute 136 again and prepares for unlocking of said latch tongue 13.

Then, said handle 15 is rotated about the axis AB of a first degree of freedom to make said handle 15 turn from the state as shown in FIG. 3 to the state as shown in FIG. 2. Said elastic bearing rod 137 is restricted by said push piece 24 with rotation of said latch tongue 13, causing the head of said elastic bearing rod 137 to move toward the outer wall direction of said latch tongue 13. The annular cylindrical surface of said latch tongue 13 rotates out from below two latch catch hooks 232, causing said notches 134 of said latch tongue 13 to be located below said latch catch hooks 232 and preparing for dismantling said water pipe connector 1. After said latch tongue 13 rotates to be in place, said pressing plate 4 on said latch tongue 13 releases the pressure on said micro-switch 29 and keep away from it so as to stop operation of said electrical component.

Finally, said water pipe connector 1 is taken out upward. Said elastic bearing rod 137 escapes from the restriction of said push piece 24 to be naturally reset and placed against said retaining piece 163, thus ensuring that said latch tongue 13 cannot rotate when said water pipe connector 1 is dismantled.

What is claimed is:

1. An out-of-vat liquid filter comprising a liquid filtration tank provided with liquid filter assembly and a dismountable water pipe connector connecting such liquid filtration tank;
    wherein said liquid filtration tank is provided with a water inlet used for importing the liquid to be processed and a water outlet used for discharging processed liquid, said out-of-vat liquid filter is further characterized in that:
    said water pipe connector comprises two water pipe connecting bases with respective valves, a valve driving shaft used for driving said two valves, a latch tongue configured for dismountable connection of said water pipe connector to said liquid filtration tank, a driving device with two degrees of freedom which can rotate about the axes of two degrees of freedom and a handle connecting said driving device with two degrees of freedom, wherein said two water pipe connecting bases are configured to connect said water inlet with a first external water pipe and said water outlet with a second external water pipe respectively and said liquid filtration tank is provided with at least one latch catch;
    said latch tongue is driven by said driving device with two degrees of freedom to rotate about a first axis of a first degree of freedom, wherein said latch tongue is configured to slide into or out of said latch catch; said valve driving shaft is driven by said driving device with two degrees of freedom to rotate about a second axis of the second degree of freedom, thereby opening or closing said water pipe connecting base by actuating the respective valves located therein.

2. The out-of-vat liquid filter according to claim 1 is characterized in that:
    a middle part of said valve driving shaft is provided with a shaft hole and said driving device with two degrees of freedom has a cylindrical-surface outer wall, which is inserted to said shaft hole of said driving shaft so that said driving device with two degrees of freedom can rotate in the shaft hole;
    when said water pipe connector connects said liquid filtration tank, said driving device with two degrees of freedom is caused by means of said handle to rotate about an axis of a first degree of freedom so as to drive said latch tongue to rotate and slide into said latch catch, and then caused by means of operating handle to rotate about an axis of the second degree of freedom so as to drive said valve driving shaft to rotate, thereby making two valves turn to opening their water pipe connecting bases and the rotation axis of said driving device with two degrees of freedom within said shaft hole leave an axis of a first degree of freedom along with rotation of said valve driving shaft; when said water pipe connector is required to be dismantled from said liquid filtration tank, said driving device with two degrees of freedom is caused by means of said handle to rotate about an axis of the second degree of freedom so as to drive said valve driving shaft to rotate, thereby making said respective valves turn to closing their water pipe connecting bases and the rotation axis of said driving device with two degrees of freedom within said shaft hole turn along with rotation of said valve driving device to be collinear with an axis of a first degree of freedom, and then caused by said handle to rotate about an axis of the first degree of freedom so as to drive said latch tongue to rotate and slide out of said latch catch.

3. The out-of-vat liquid filter according to claim 2 is characterized in that:
    a bottom of said driving device with two degrees of freedom is provided with a protruding connecting tongue piece;
    a top of said latch tongue is provided with a boss, a middle part of which is provided with a concave-down sliding chute;
    when the rotation axis of said driving device with two degrees of freedom within said shaft hole is collinear with an axis of a first degree of freedom, said connecting tongue piece slides into said sliding chute, causing said latch tongue to be driven by said driving device with two degrees of freedom and cause said latch tongue to rotate about an axis of a first degree of freedom accordingly; when the rotation axis of said driving device with two degrees of freedom within said shaft hole leave an axis of a first degree of freedom along with rotation of said valve driving device, said connecting tongue piece slides out of said sliding chute, causing said latch tongue not to be driven by driving device with two degrees of freedom to rotate.

4. The out-of-vat liquid filter according to claim 2 is characterized in that:
    said water pipe connector also includes a fixed seat, which is provided with a first shaft hole with a first degree of freedom coaxial with an axis of a first degree of freedom as well as with a second shaft hole with a second degree of freedom coaxial with an axis of a second degree of freedom; said first shaft hole with a first degree of freedom is connected with said second shaft hole with a second degree of freedom, thus forming a shaft cavity;
    said valve driving shaft is installed in said second shaft hole with a second degree of freedom; said fixed seat is provided with a concave-down notch along an axis of a first degree of freedom, by means of which said driving device with two degrees of freedom installed in said first shaft hole with a first degree of freedom is enabled to rotate in the shaft cavity of said fixed seat, thereby driving said valve driving shaft to rotate;
    below the first shaft hole with a first degree of freedom of said fixed seat said latch tongue is connected rotatably.

5. The out-of-vat liquid filter according to claim 4 is characterized in that:
    at the top of said liquid filtration tank, two latch catches are installed between said water inlet and said water outlet; each said latch catch includes a vertically-installed latch catch wall and a latch catch hook, one end of which is installed at the top of said latch catch wall and the other end of which protrudes in a horizontal direction, thereby forming a hook mouth between said latch catch wall and said latch catch hook; the hook mouths of the two latch catches are installed directly facing each other;

said latch tongue is annularly columnar and the cylindrical-surface outer wall of said latch tongue is symmetrically provided with two radially concave notches;

when said water pipe connector is installed on said liquid filtration tank, said latch catches pass said latch tongue through their corresponding notches respectively, causing said latch tongue to be caught between two latch catch walls, and the bottom surface of said latch catch hook is higher than the top surface of said latch tongue; said latch tongue is rotated to make its annular column located below said latch catch hook, that is, it is achieved that said latch tongue slides into said latch catch, thereby connecting said water pipe connector to said liquid filtration tank.

6. The out-of-vat liquid filter according to claim 4 is characterized in that:

said latch tongue is annularly columnar, the top surface of said latch tongue is provided with an annular top groove denting downward along the axis of said latch tongue, the bottom surface of said latch tongue is provided with an annular bottom groove denting upward along the axis of said latch tongue, and the diameter of said annular top groove is less than that of said annular bottom groove; said latch tongue is also provided with an annular sliding chute which is connected with the bottom of said annular top groove as well as the top of said annular bottom groove;

said first shaft hole with a first degree of freedom is provided with an annular enclosure wall stretching downward at the orifice edge at the bottom of said fixed seat, and said annular enclosure wall is provided with at least two flanges;

said annular enclosure wall is inserted into said annular top groove of said latch tongue, and rotatable connection of said latch tongue is achieved below said first shaft hole with a first degree of freedom by means of catching said flange in said annular sliding chute.

7. The out-of-vat liquid filter according to claim 4 is characterized in that:

an outer wall at the bottom of said fixed seat is provided with a support protruding outside said fixed seat, and at the end of said support a retaining piece protruding downward is installed;

an outer wall of said latch tongue is provided with an elastic bearing rod whose root is flexibly connected with the outer wall of said latch tongue, and there is space left between said elastic bearing rod and said outer wall of latch tongue;

when a head of said elastic bearing rod is pressed, said elastic bearing rod can move in the outer wall direction of said latch tongue; when said latch tongue slides out of said latch catch, the head of said elastic bearing rod is not pressed but placed against said retaining piece so that when said water pipe connector is not installed on said liquid filtration tank, said latch tongue is prevented from rotating;

said liquid filtration tank is provided with a push piece so that when said water pipe connector is installed on said liquid filtration tank said push piece forces the head of said elastic bearing rod to be pressed to move in the outer wall direction of said latch tongue, thereby causing the head of said elastic bearing rod to avoid said retaining piece from blocking and then enabling said latch tongue to rotate.

8. The out-of-vat liquid filter according to claim 1 is characterized in that:

the filter assembly in said liquid filtration tank includes an electrical component, and said liquid filtration tank is provided with a micro-switch which controls the start and stop of said electrical component;

there is a pressing plate connected with said latch tongue;

when said water pipe connector is installed on said liquid filtration tank and said latch tongue slides into said latch catch, said pressing plate presses said micro-switch, causing the electrical component in said liquid filtration tank to start operating; under the circumstance where said water pipe connector is dismantled from said liquid filtration tank, when said latch tongue slides out of said latch catch, said pressing plate releases said micro-switch along with rotation of said latch tongue, causing said electrical component in said liquid filtration tank to stop operating.

9. The out-of-vat liquid filter according to claim 1 is characterized in that:

the filter assembly in said liquid filtration tank includes an electrical component, and said liquid filtration tank is provided with a magnetic sensor which controls the start and stop of said electrical component;

there is a permanent magnet connected with said latch tongue;

when said water pipe connector is installed on said liquid filtration tank and said latch tongue slides into said latch catch, said permanent magnet approaches said magnetic sensor, causing the electrical component in said liquid filtration tank to start operating; under the circumstance where said water pipe connector is dismantled from said liquid filtration tank, when said latch tongue slides out of said latch catch, said permanent magnet moves away from said magnetic sensor along with rotation of said latch tongue, causing said electrical component in said liquid filtration tank to stop operating.

10. The out-of-vat liquid filter according to claim 1 is characterized in that:

said water pipe connecting base includes a valve seat with a cavity internally, two tubular filtration tank pipes connected at the bottom of said valve seat and two tubular joint pipes connected at the top of said valve seat;

the cavity in said valve seat is connected with said filtration tank pipe and said joint pipe respectively; each said valve is installed in the cavity of said valve seat; said two filtration tank pipes are used to connect said water inlet and said water outlet respectively and said two joint pipes are used to connect a first externally-connecting water pipe and a second externally-connecting water pipe.

11. The out-of-vat liquid filter according to claim 10 is characterized in that:

said water inlet and said water outlet are installed at the top of said liquid filtration tank, and two latch catches are installed between said water inlet and said water outlet; each said latch catch includes a vertically-installed latch catch wall, a latch catch hook, one end of which is connected at a top of said latch catch wall and the other end of which protrudes in a horizontal direction, and a positioning boss which is installed vertically upward at the top surface of one end of said latch catch hook not connecting said latch catch wall; a hook mouth is formed between said latch catch wall and said latch catch hook; the hook mouths of said two latch catches are installed directly facing each other;

said two valve seats are each provided with locating notches respectively which are formed with their bottom surfaces concave upward and their side walls concave inward, and said two locating notches are installed directly facing each other;

when said water pipe connector is installed on said liquid filtration tank, said two positioning bosses are inserted into two locating notches correspondingly, thereby achieving located installation of said water pipe connecting base on said liquid filtration tank.

12. The out-of-vat liquid filter according to claim 10 is characterized in that:

said valve is the ball valve formed after two spherical caps of a sphere with cylindrical surface through-hole are cut off by two parallel planes parallel to said cylindrical surface through-hole, wherein said cylindrical surface through-hole is valve hole and the plane formed after spherical caps are cut off is valve face; a side of said valve is provided with a flat cubic cylindrical surface shaft connecting hole, the axial central axis of which is perpendicular to the axis of said valve hole; said shaft connecting holes of two valves are installed directly facing each other;

one side of said valve seat is provided with a transverse shaft through-hole, and said transverse shaft through-holes of two valve seats are installed directly facing each other;

both ends of said valve driving shaft are provided with flat cubic valve plugs respectively; both ends of said valve driving shaft pass through said transverse shaft through-holes of said valve seats corresponding to these two ends and are inserted into said shaft connecting holes corresponding to them respectively, thereby two valves being connected at both ends of said valve driving shaft respectively.

13. The out-of-vat liquid filter according to claim 4 is characterized in that:

the top of said liquid filtration tank is provided with a concave-down recess, in which said water inlet, said water outlet and said latch catch are installed;

said water pipe connector also includes a connecting cover, which includes a top plate and an enclosure wall stretching downward from an edge of said top plate; said top plate is provided with two through-holes, which are used for connecting said two water pipe connecting bases respectively; on said top plate a handle operated recess is installed between two through-holes; said fixed seat is permanently connected with the bottom surface of said top plate to make said handle operate in said handle-operated recess.

* * * * *